United States Patent
Kim

(10) Patent No.: US 7,325,010 B1
(45) Date of Patent: Jan. 29, 2008

(54) INFORMATION MODELING METHOD AND DATABASE SEARCHING METHOD USING THE INFORMATION MODELING METHOD

(76) Inventor: Chungtae Kim, 116-1202 Kachi-maeul, 77 Goomi-dong, Bundang-ku, Sungnam-shi, Kyunggi-do (KR) 463-500

( * ) Notice: Subject to any disclaimer, the term of this patent is extended or adjusted under 35 U.S.C. 154(b) by 0 days.

(21) Appl. No.: 10/168,466

(22) PCT Filed: May 20, 2000

(86) PCT No.: PCT/KR00/00505

§ 371 (c)(1),
(2), (4) Date: Jun. 20, 2002

(87) PCT Pub. No.: WO01/50345

PCT Pub. Date: Jul. 12, 2001

(30) Foreign Application Priority Data

Dec. 22, 1999 (KR) ................................ 1999-60254

(51) Int. Cl.
 *G06F 7/00* (2006.01)
 *G06F 17/00* (2006.01)
 *G06F 3/00* (2006.01)
 *G06F 13/00* (2006.01)

(52) U.S. Cl. ............... 707/104.1; 707/100; 725/53; 703/22

(58) Field of Classification Search ............ 703/22; 707/100, 104.1; 725/53
See application file for complete search history.

(56) References Cited

U.S. PATENT DOCUMENTS 5,655,117 A * 8/1997 Goldberg et al. ........... 707/102

(Continued)

FOREIGN PATENT DOCUMENTS

| JP | 07-175808 | 7/1995 |
| JP | 09-081588 | 3/1997 |

OTHER PUBLICATIONS

Chang, Shih-Fu et al. "A Fully Automated Content-Based Video Search Engine Supporting Spatiotemporal Queries." IEEE Transactions on Circuits and Systems for Video Technology. Sep. 1998. vol. 8, Issue 5, pp. 602-615.*

(Continued)

*Primary Examiner*—Paul Rodriguez
*Assistant Examiner*—Ayal Sharon
(74) *Attorney, Agent, or Firm*—Volpe and Koenig, P.C.

(57) ABSTRACT

An information modeling method receives various kinds of data; analyzes the data into semantic elements, that is, temporal information data including temporal information, spatial information data including spatial information indicating locations, object information data including object information which is an object of the function of data other than the temporal information data and the spatial information data and which interacts with the other data, and thing information data including the remaining thing information other than the temporal information, the spatial information and the object information; and establishes a database which is composed of an action including at least one among the temporal information data, spatial information data, object information data and thing information data, a module which is a higher group of the action, and a situation which is a higher group of the module, using the analyzed data. In a search system constructed according to this information modeling method, information input by a user is connected to a database and is analyzed into semantic elements such as time, space, situation name and keyword. Then, the database is searched for actions, modules and situations including the semantic elements so that the information requested by the user can be extracted.

4 Claims, 8 Drawing Sheets

U.S. PATENT DOCUMENTS

| | | | |
|---|---|---|---|
| 5,734,893 A * | 3/1998 | Li et al. | 707/4 |
| 6,381,605 B1 * | 4/2002 | Kothuri et al. | 707/100 |
| 6,411,724 B1 * | 6/2002 | Vaithilingam et al. | 382/100 |
| 6,446,060 B1 * | 9/2002 | Bergman et al. | 707/3 |
| 6,446,083 B1 * | 9/2002 | Leight et al. | 707/104.1 |
| 6,470,344 B1 * | 10/2002 | Kothuri et al. | 707/100 |
| 6,564,263 B1 * | 5/2003 | Bergman et al. | 709/231 |
| 6,571,054 B1 * | 5/2003 | Tonomura et al. | 386/95 |
| 6,961,954 B1 * | 11/2005 | Maybury et al. | 725/53 |
| 2005/0165613 A1 * | 7/2005 | Kim | 705/1 |

OTHER PUBLICATIONS

Idris, F.M. et al. "Spatio-temporal Indexing of Vector Quantized Video Sequences." IEEE Transactions on Circuits and Systems for Video Technology. Oct. 1997. vol. 7, Issue 5, pp. 728-740.*

Smoliar, S.W. et al. "Content-Based Video Indexing and Retrieval." IEEE Multimedia. Summer 1994. vol. 1, Issue 2, pp. 62-72.*

Flickner, M. et al. "Query by Image and Video Content: the QBIC System." Computer. Sep. 1995. vol. 28, Issue 9, pp. 23-32.*

Deng, Yining et al. "Ne Tra-V: Toward an Object-Based Video Representation." IEEE Transactions on Circuits and Systems for Video Technology. Sep. 1998. vol. 8, Issue 5, pp. 616-627.*

Nack, F. et al. "Everything You Wanted to Know about MPEG-7: Part 1." IEEE Multimedia. Jul.-Sep. 1999. vol. 6, Issue 3, pp. 65-77.*

Huang, Qian et al. "Multimedia Search and Retrieval: New Concepts, System Implementation, and Application." IEEE Transactions on Circuits and Systems for Video Technology. Aug. 2000. vol. 10, Issue 5. pp. 679-692.*

Chang, Yuh-Lin et al. "Integrated Image and Speech Analysis for Content-Based Video Indexing." Proc. of the 3rd IEEE Int'l Conf. on Multimedia Computing and Systems. Jun. 17-23, 1996. pp. 306-313.*

Yeung, M.M. et al. "Time-Constrained Clustering for Segmentation of Video Into Story Units." Proc. of the 13th Int'l Conf. on Pattern Recognition. Aug. 25-29, 1996. vol. 3, pp. 375-380.*

Kim, Chung Tae et al. "Design of Software Reuse Using Object Model in System Analysis." Proc. of 2000 IEEE Int'l Conf. on Management of Innovation and Tech (ICMIT 2000). Nov. 2000. vol. 2, pp. 556-560.*

Kim, Chung Tae. "Indexing Method in Web Based Multimedia Content Development." Journal of Central & East European Studies. 2001. www.kabes.or.kr/thesis/3-2-3-3kjt.pdf.*

Kim, Chung Tae et al. "Design of Object Model Reuse System by CBR in System in Analysis." 2004. Int'l Journal of Software Eng'g and Knowledge Eng'g. vol. 14, No. 3, pp. 277-290.*

The Merriam-Webster's Collegiate Dictionary, 10th Ed. © 2001. pp. 1059-1060.*

Date, C.J. An Introduction to Database Systems, 3rd Ed. © 1981. pp. xxi-xxvii, 1-28, 33-53, and 63-79.*

Nack, F. et al. "Everything You Wanted to Know about MPEG-7: Part 2." IEEE Multimedia. Oct.-Dec. 1999. vol. 6, Issue 4, pp. 64-73.*

An Information Retrieval System Based on Full-text Semantic Analysis; Sunouchi et al.; (Sep. 11, 1992).

Information Sharing Platform Based on 5W1H Clustering and Navigation; Okumura et al.; NEC C&C Media Research Laboratories (Sep. 19, 1997).

* cited by examiner

INFORMATION MODELING METHOD AND DATABASE SEARCHING METHOD USING THE INFORMATION MODELING METHOD

BACKGROUND OF THE INVENTION

1. Field of the Invention

The present invention relates to an information modeling method and a database search system, and more particularly, to an information modeling method of receiving and analyzing data into a temporal element, a spatial element, a object element and/or thing element and establishing a database using the analyzed semantic elements, and a search method of extracting only information, which meets a user's request for information, using the established database.

2. Description of the Related Art

Modeling is to suggest a frame work at a system analysis and design step during establishment of a database or an information system. Generally, modeling is divided into conceptual modeling, logical modeling and physical modeling. There are conventional modeling methods such as entity relationship (ER) modeling for development of a relational database, object oriented analysis and design (OOAD) modeling for development of an object oriented database, and hierarchical data modeling for development of a hierarchical database.

For the ER modeling, data is indexed using an entity relationship between entities or between entities' attributes during design of a database so that a database user or designer can define data needed. In order to realize the result of the ER modeling as a relational database, requests for data defined through the ER modeling should be represented by a format defined at the relational database, that is, by a table. To table the requests, each entity is organized into a single table, and relationships between tables of each entity are organized into a separate table (conversion into a entity table) or added to the entity's table as an item (conversion into a relationship table). In the case of tabling a relationship between entities, for a 1:N relationship, to the table of an entity having a single relationship with respect to the other entities is added the key attribute of the other entity as another item. For a 1:1 relationship, since either of two entities has a single relationship with the other one, the attribute of one entity is added to the table of the other entity.

For the OOAD modeling, a single information entity in the real world is represented by an object into which a data structure and behavior are combined. OOAD describes a query object in complementary view of information, dynamic and function, using object modeling, dynamic modeling and functional modeling with basic concepts of a class, which includes an object, the attribute, behavior of the object and a set of similar objects, and a relationship between objects, thereby suggesting a model close to the appearance of the real world. The object modeling is to find an object requested by a user and investigate a relationship between objects and their attributes and the objects. The dynamic modeling is to show a life cycle including the behavior of the objects investigated by the object modeling and including the states of the objects. The functional modeling is to describe behavior in response to a change in the form of each object disclosed by the dynamic modeling.

In the hierarchical data modeling, related information is hierarchically arranged, having a form like a systematic diagram referred to as a tree structure. A hierarchical structure has a 1:n relationship. In this relationship, a parent-child relationship (PCR) is included, and a child cannot be involved in two or more PCRs.

In databases established according to the conventional information modeling methods described above, data is stored in the form of files. When a query is entered, a whole document including the query is retrieved. Accordingly, a search method suitable for a database established according to a conventional information modeling method is restricted to a search based on a keyword such as a person's name or an event's name.

Moreover, in the case of multimedia data such as a moving image displayed in the form of consecutive images, there is a disadvantage in that the multi-data should be sequentially searched from the beginning for a portion needed by a user.

SUMMARY OF THE INVENTION

To solve the above problems, it is a first object of the present invention to provide an information modeling method for extracting desired information only such as historical materials, industrial information, documents, educational information or video information which is requested by a user, by connecting to a database including data corresponding to the above materials, performing modeling by analyzing input information into semantic elements such as a temporal element, spatial element, temporal and spatial element, situation name and keyword which are the elements of the user's request, and searching the database for a situation, module and action related to the analyzed user's request.

It is a second object of the present invention to provide a search method for allowing a user to search desired information only by using the above information modeling method of the present invention.

Accordingly, to achieve the above objects of the present invention, various kinds of data is analyzed into temporal information data including temporal information, spatial information data including spatial information indicating locations, object information data including object information which is an object of the function of data other than the temporal information data and the spatial information data and which interacts with the other data, and thing information data including the remaining thing information other than the temporal information, the spatial information and the object information. A database is formed by establishing a diagram composed of an action, i.e., a minimum semantic unit, a module and a situation using the temporal information data, the spatial information data, the object information data and the thing information data. The module includes a first action and at least one other action related to at least one of the temporal information data, the spatial information data, the object information data and the thing information data of the first action. The situation includes a first module and at least one other module related to at least one of the temporal information data, the spatial information data, the object information data and the thing information data of the first module. Information requested by a user is extracted using the database and externally displayed.

According to the present invention, probability of searching for only information desired by a user increases. In addition, since a database system using information modeling according to the present invention can process a user's request for information and can be extended simply by adding data, update and modification of the system is not necessary. Accordingly, cost for the update and modification of the system can be saved, and the inconvenience of using the system can be reduced.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE PRESENT INVENTION

An embodiment of the present invention will be described in detail with reference to the attached drawings.

Figure 1:
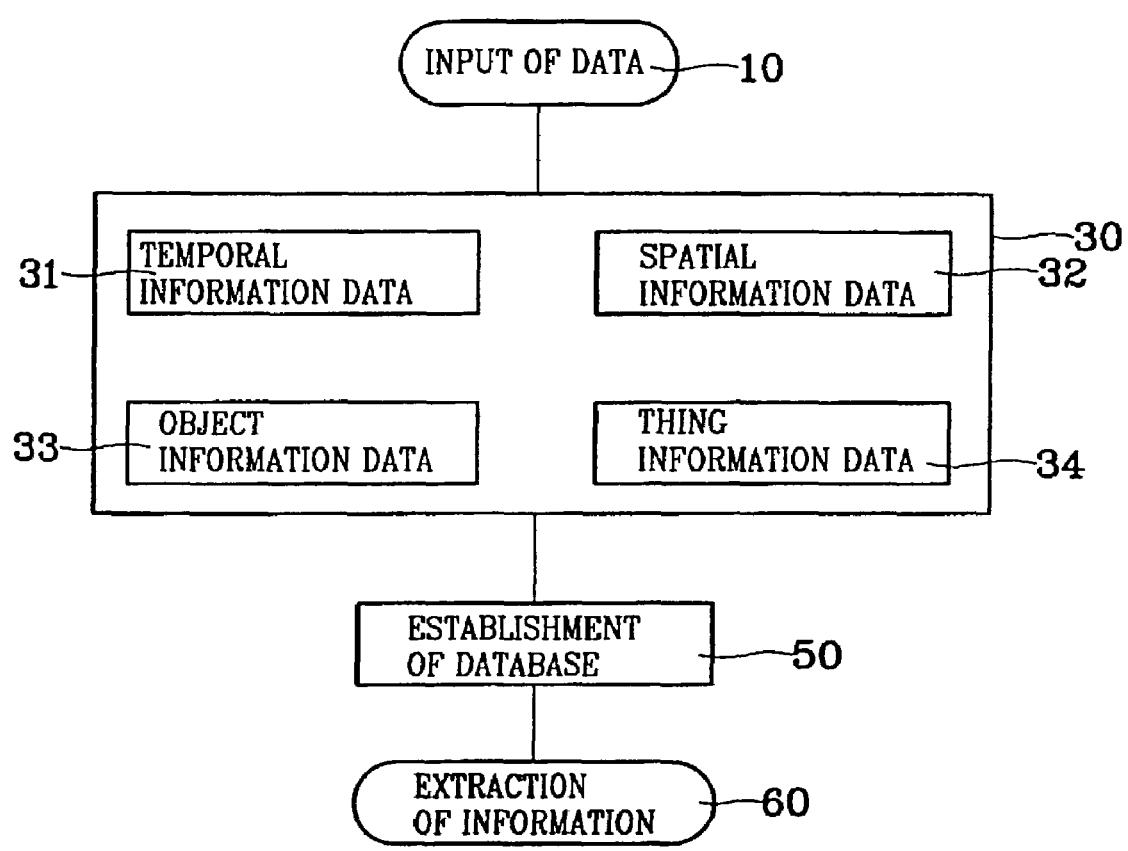
FIG. 1 is a flowchart of information modeling according to the present invention.

Referring to FIG. 1, an information modeling method includes a data input step 10, step 30 of analyzing data input by a user, step 50 of establishing a database and step 60 of extracting information requested using the established database. In the data analyzing step 30, various kinds of data is analyzed into temporal information data 31 including temporal information, spatial information data 32 including spatial information indicating locations, object information data 33 including object information which is an object of the function of data other than the temporal information data 31 and the spatial information data 32 and which interacts with the other data, and thing information data 34 including the remaining thing information other than the temporal information, the spatial information and the object information. In the step 50 of establishing a database, the analyzed data is arranged to form on a diagram. The diagram is composed of an action containing at least one among the temporal information data, the spatial information data, the object information data and the thing information data; a module including a first action and another action having data related to data constituting the first action; and a situation including a first module and another module having data related to data constituting the first module.

Figure 2:
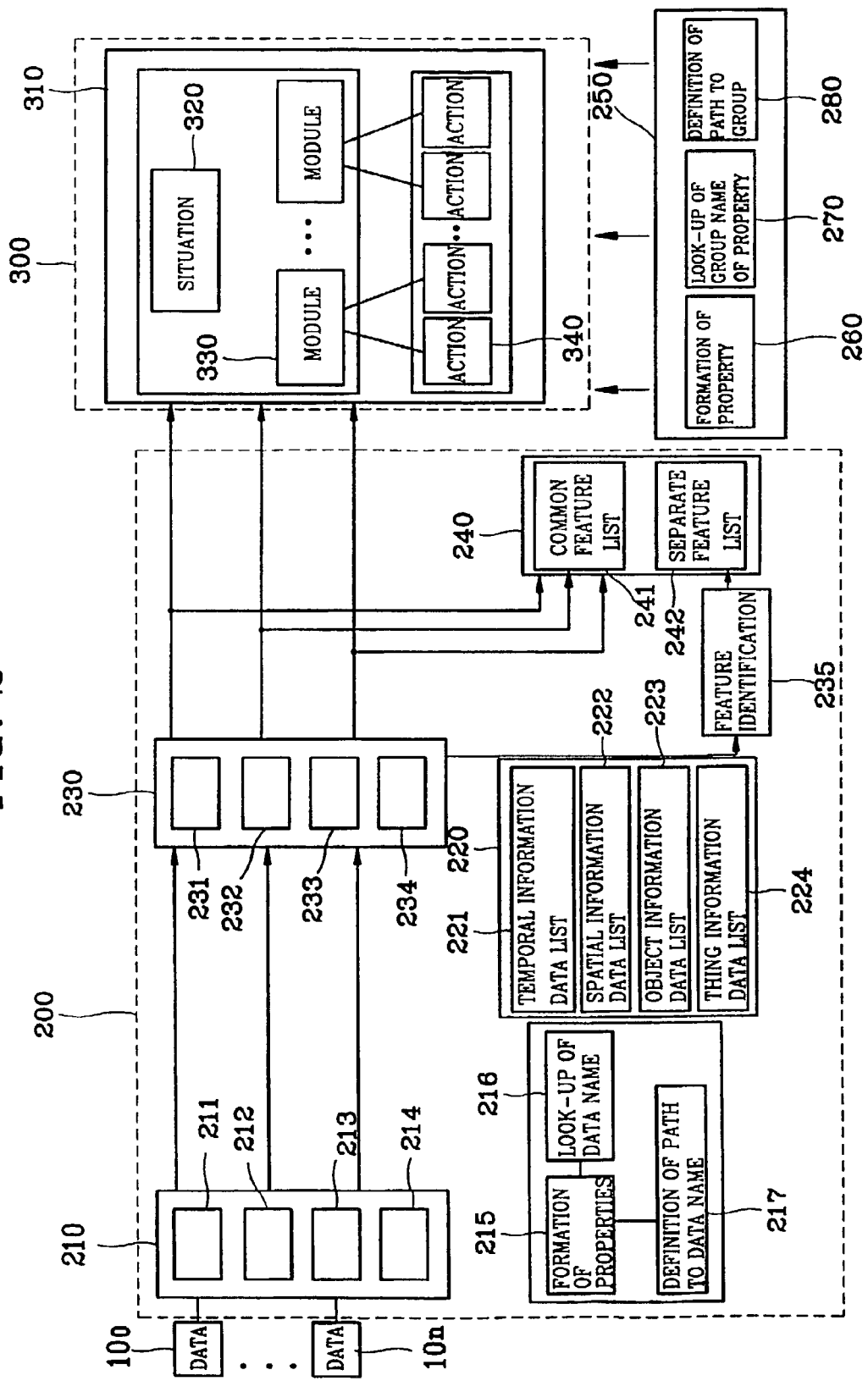
FIG. 2 is a block diagram of an embodiment of information modeling according to the present invention.

An embodiment of information modeling according to the present invention is shown in FIGS. 2 through 6D. In FIG. 2, reference numeral 200 denotes an analyzing step for information requested, and reference numeral 300 denotes the step of establishing a database. In the analyzing step 200, input data $10_0$ through $10_n$ is analyzed into temporal information data 211, spatial information data 212, object information data 213 and thing information data 214. Next, the temporal information data, the spatial information data, the object information data and the thing information data are led to corresponding unit cells 231, 232, 233 and 234, respectively. The analyzing step includes step 215 of forming expressive properties by defining each of the temporal information data, the spatial information data, the object information data and the thing information data as a formula in view of the name of at least one unit cell, step 216 of looking up the data names of the expressive properties, and step 217 of defining a path to each expressive property's data name used for determining a value of the expressive property. The step 216 of looking up the data names of the expressive properties includes a step of performing extensive look-up with respect to the temporal information data, the spatial information data, the object information data and the thing information data. The extensive look-up step is a procedure of forming a data feature list for analysis of information. In the extensive look-up step, the temporal information data name, spatial information data name, object information data name and thing information data name of the expressive properties are looked up to form at least one feature list 220. The feature list 220 includes a temporal information data list 221, a spatial information data list 222, an object information data list 223 and a thing information data list 224. Meanwhile, the analyzing step for information requested further includes a step 240 of forming a common feature list 240, which can be commonly applied to data generated from the unit cells, and a separate feature list 242 for leading input data to the corresponding unit cells. The analyzing step further includes a feature identification step 235 of identifies each unit cell as unique one discriminated from the others in terms of the temporal information data 211, the spatial information data 212, the object information data 213 and the thing information data 214.

Figure 3:
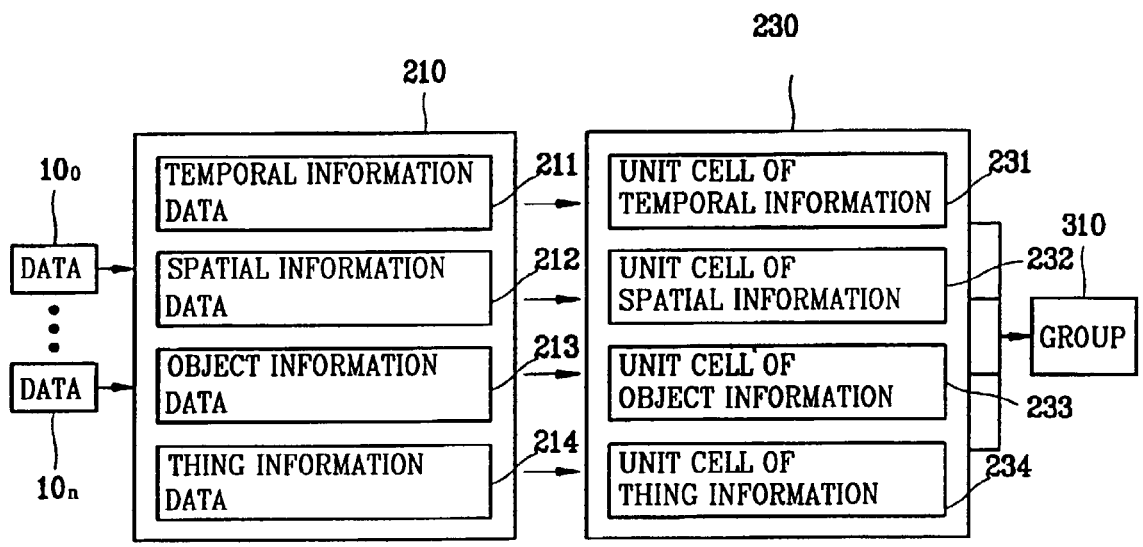
FIG. 3 is a block diagram of a procedure in which information input by a user is adapted to a group through analysis for information requested.

FIG. 3 is a block diagram of a procedure in which information input by a user is adapted to a group through analysis for information requested. In the database establishment step 300 includes a step of forming a group 310 in which the unit cells corresponding to the temporal information data 211, the spatial information data 212, the object information data 213 and the thing information data 214 are assembled in a set having a common feature. Here, the group 310 has many sets having a common feature and has at least one member property.

Figure 5:
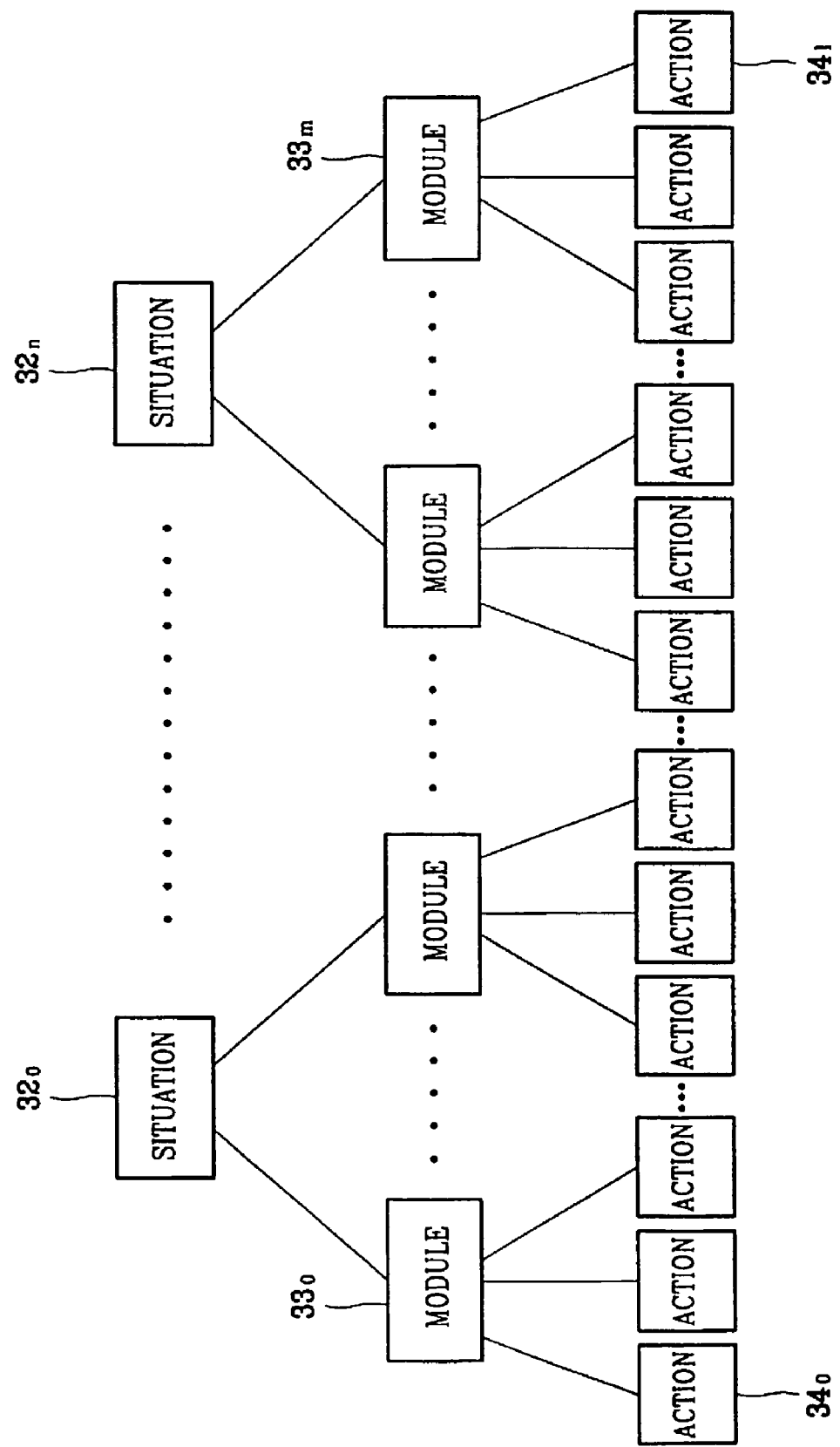
FIG. 5 is a block diagram of the hierarchical structure of a group.
Figure 6A:
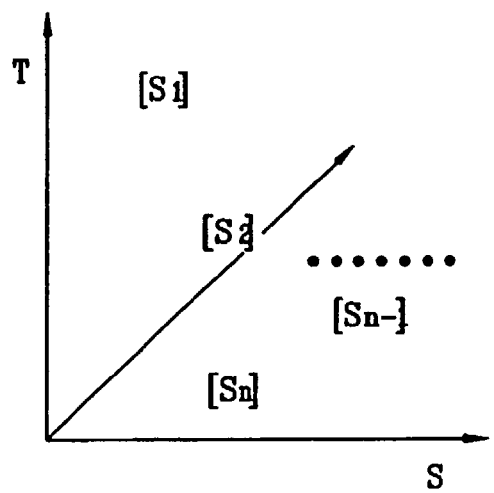
FIG. 6A is a graph of the temporal and spatial flow of situations in an information modeling method according to the present invention.
Figure 6B:
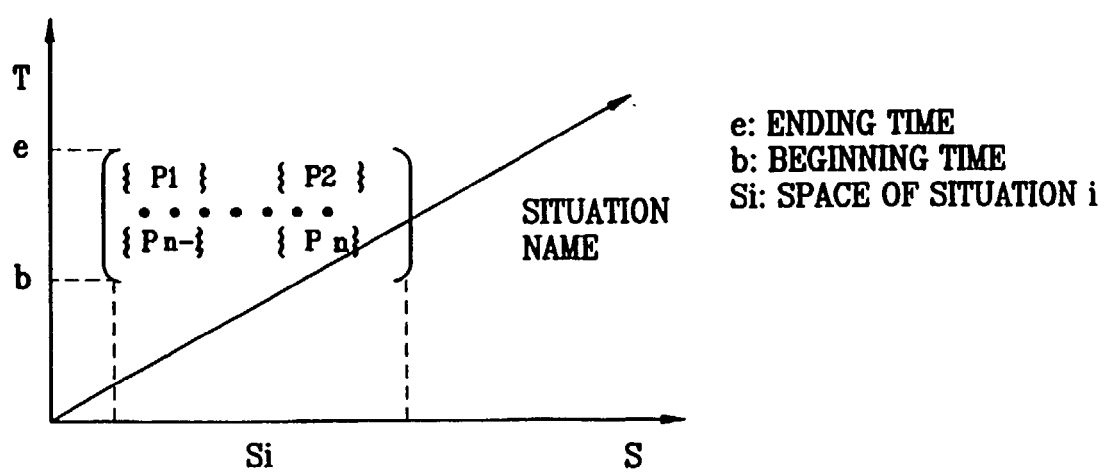
FIG. 6B is a graph of the temporal and spatial flow of modules in a situation in an information modeling method according to the present invention.
Figure 6C:
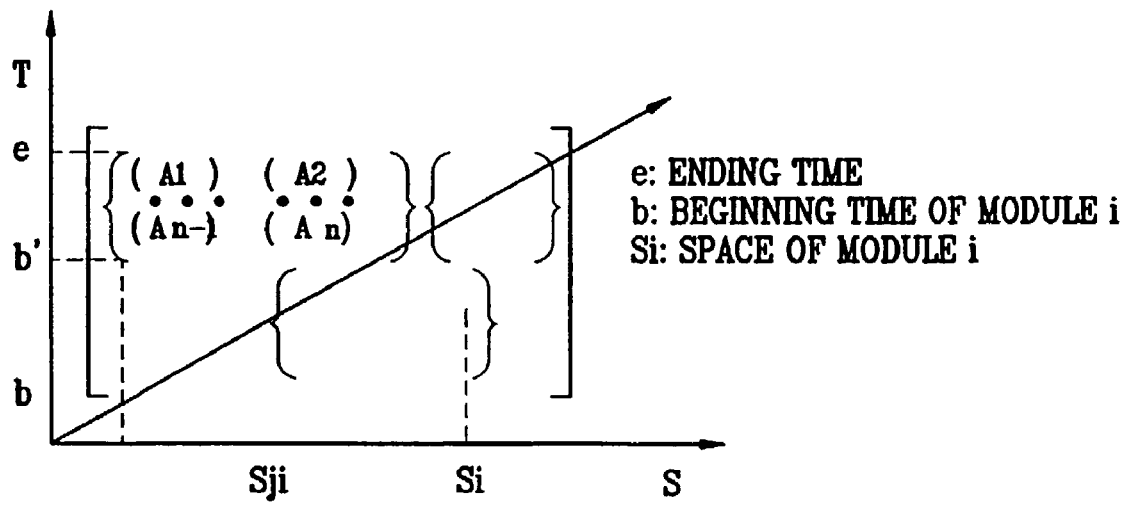
FIG. 6C is a graph of the temporal and spatial flow of actions at a module in a situation in an information modeling method according to the present invention.
Figure 6D:
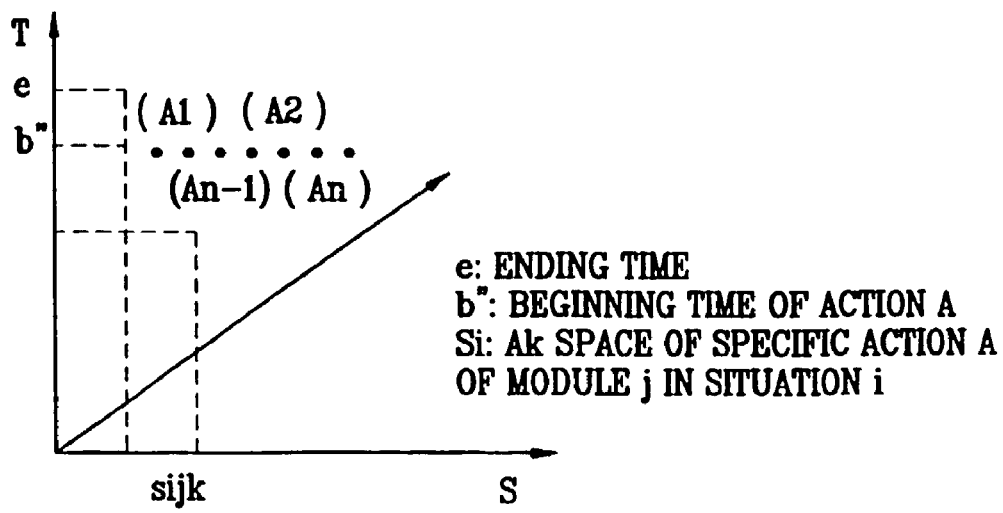
FIG. 6D is a graph of the locations of actions in the flow of the actions in an information modeling method according to the present invention.

The hierarchical structure of the group 310 formed in the database establishment step is shown in FIG. 5. The group 310 includes actions $34_0$ through $34_l$, modules $33_0$ through $33_m$ and situations $32_0$ through $32_n$. Each action is a minimum semantic unit including temporal information data, spatial information data, object information data and thing information data. Each module includes a first action and at least one other action related to at least one of the temporal information data, spatial information data, object information data and thing information data of the first action. Each situation includes a module and at least one other module related to at least one of the temporal information data, spatial information data, object information data and thing information data of the former module. Each of the action, module and situation includes independent information content.

Figure 4:
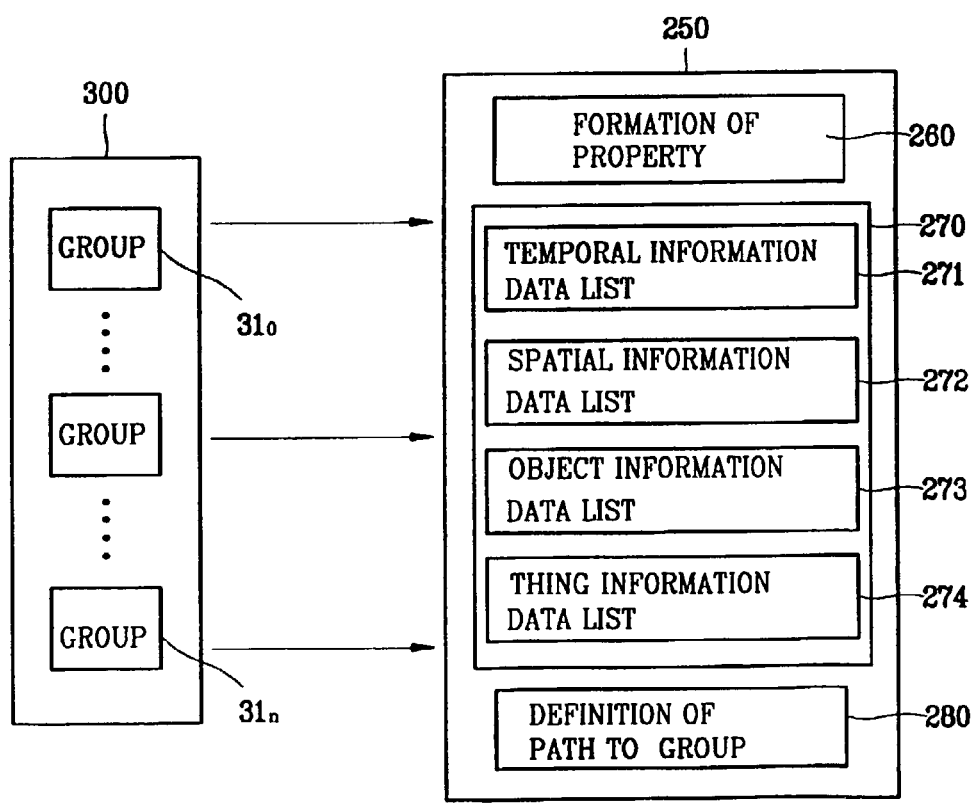
FIG. 4 is a block diagram of a procedure of making a separate feature list of a database.

FIG. 4 is a block diagram of a procedure of making a separate feature list in a database establishment step. The procedure includes a property formation step 260 of defining a formula in view of at least one group composed of a plurality of unit cells corresponding to the temporal information data, spatial information data, object information data and thing information data which are included in the group 310; a step 270 of looking up the group name of a property in a plurality of groups $31_0$ through $31_n$; and a step 280 of defining a path to the property's group name used for determining a value of the property. Relationships among a unit cell, an action including the unit cell, another action, a first module including an action, another module, still another module including the first module, and a preceding module can be understood based on the name and the path.

The step 270 includes extensive look-up with respect to the plurality of groups. In the extensive look-up, the group name having a given property is looked up to form at least one list 270.

FIGS. 6A through 6D are graphs showing the spatial and temporal flows of situations, modules and actions in an information modeling method according to the present invention. A situation may be an independent single unit and may depend on preceding and succeeding situations. A situation is divided from the other situations based on time and space, and related situations are in a hierarchical flow. Similarly, either of a module and an action may be an independent single unit and may depend on preceding and succeeding modules or actions. Either of a module and an action divided from the other ones in a temporal and spatial domain. Modules and actions have hierarchical flows.

Picture 1

{(God)created the heavens and the earth.)(Now the earth was formless and empty),(darkness was over the surface of the deep), and (the Spirit of God was hovering over the waters)}

For example, Picture 1 is excerpted from Genesis of the Bible. Entire Genesis is considered as a situation, and paragraphs are considered as modules. A module is represented by { }, an action is represented by ( ), an object is represented by ○, and a thing is represented by □. Here, a main module is that "God" created the "heaven" and the "earth". A relationship between an essential object and an essential thing expresses an action.

As described above, an action is a minimum semantic unit including at least one among the temporal information dat, spatial information data, object information data and thing information data.

Figure 7:
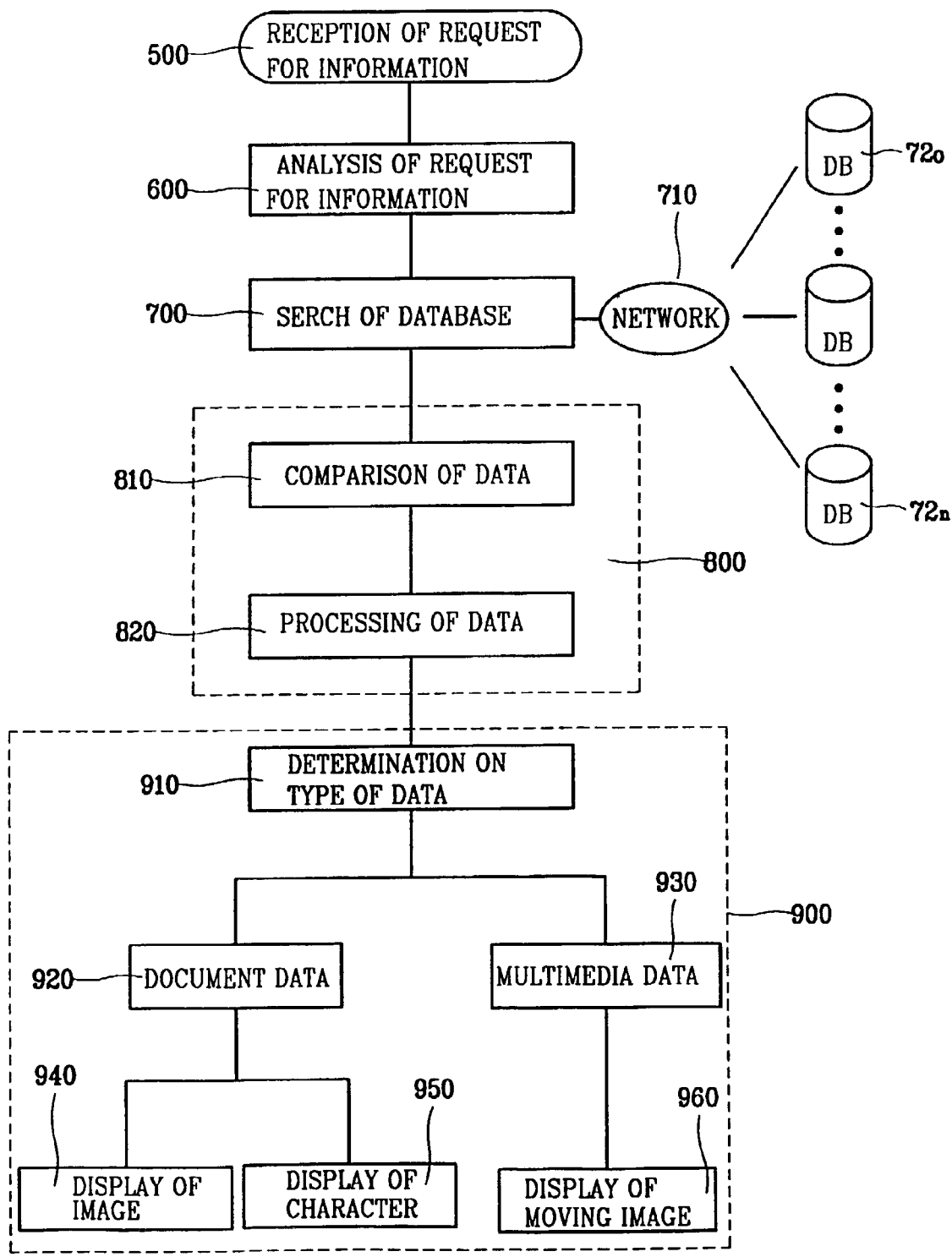
FIG. 7 is a flowchart of a data search method according to the present invention.

FIG. 7 is a flowchart of a search method using a database established through information modeling according to the present invention. The search method includes a step 500 of receiving a user's request for information through an interface such as a computer terminal, a step 600 of analyzing the received request for information, a step 700 of searching a database established according to the above modeling method, a step 800 of extracting data, and a step 900 of displaying the data.

Figure 8:
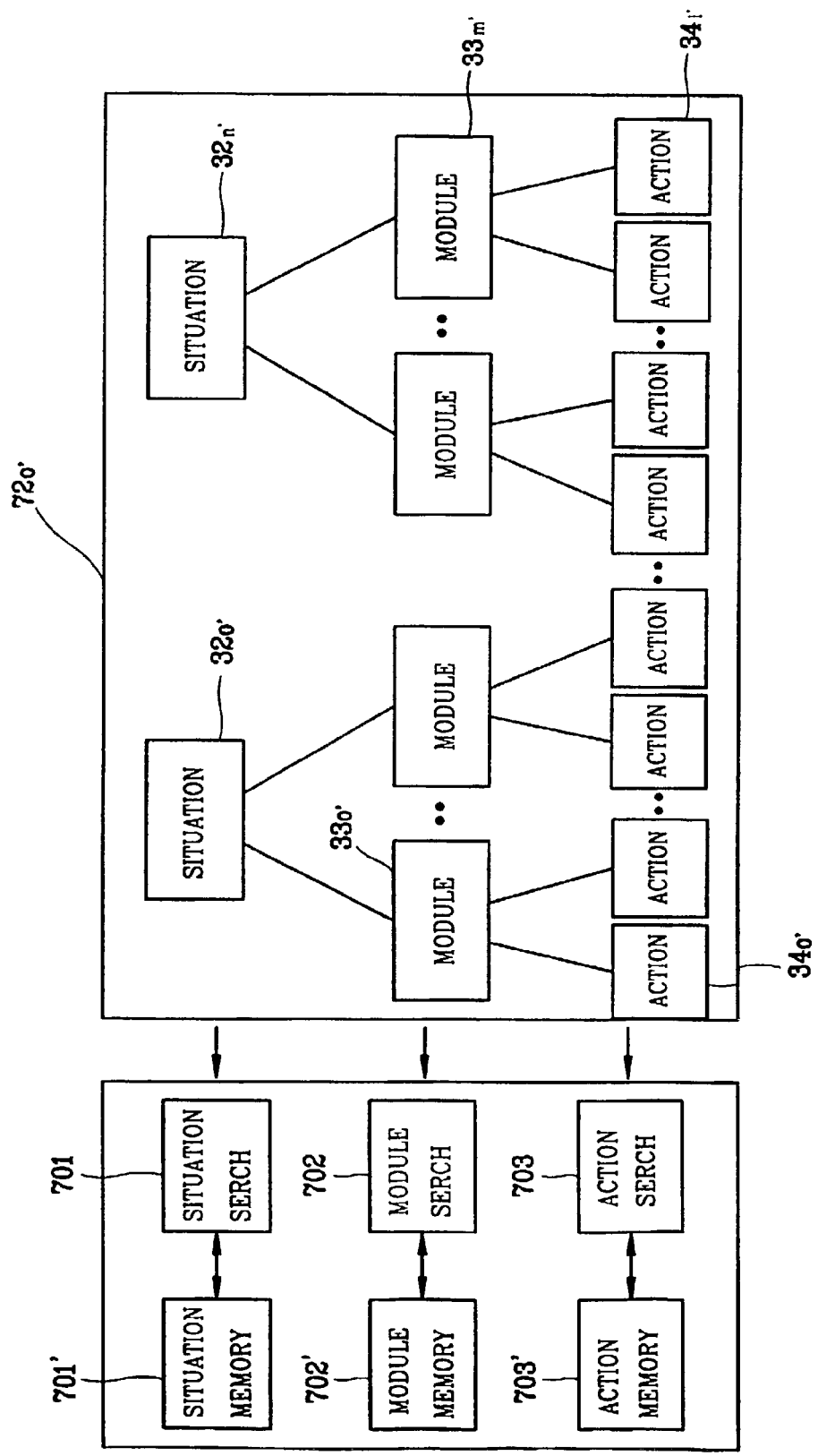
FIG. 8 is a block diagram of a procedure of storing information features in a data search method.

Once a plurality of pieces of information expressing the user's request is input, in the step 600, the information is analyzed into at least one of temporal information data, spatial information data, object information data and thing information data according to the above information modeling method, and a group including an action, a situation and a module is constituted based on the analyzed data. In the step 700, a database $72_0$ is searched. The database $72_0$ includes at least one situation which includes a module and at least one other module related to at least one among the temporal information data, spatial information data, object information data and thing information data contained in the former module. A module includes a first action and at least one other action related to at least one among the temporal information data, spatial information data, object information data and thing information data of the first action. An action, a minium semantic unit, includes the temporal information data containing temporal information, spatial information data containing spatial information indicating locations, object information data containing object information which is an object of the function of data other than the temporal information data and spatial information data and which interacts with the other data, and thing information data including the remaining thing information other than the temporal information, the spatial information and the object information. Any of the situation, module and action contains independent information content. Referring to FIG. 8, in searching a database, an action $34_0'$-$34_L'$ including temporal information data, spatial information data, object information data and/or thing information data corresponding to the analyzed information data is looked up in the database. In addition, a module $33_0'$-$33_m'$ which is the higher group of the action and a situation $32_0'$-$32_n'$ which is the higher group of the module are looked up so that data meeting the user's request can be derived.

Next, in the step 800, a data comparator performs an appropriate operation on the derived data and the plurality of pieces of information of the user's request in step 810, and the data containing the user's request is arranged and processed in step 820. In performing the operation on the derived data, data corresponding to the extracted user's request and a situation, module and action which can be contained in the data are extensively extracted in terms of temporal element, spatial element, object element and thing element. In addition, the data corresponding to the extracted user's request and a temporal element, spatial element, object element and thing element which can be contained in the data are extensively extracted in terms of situation, module and action. The operated, arranged and processed data is stored in memory units 701' through 703' which memorize the features of information acquired from each of the action, module and situation, as shown in FIG. 8.

In order to display the data, in step 910, the type of the data is determined. If the data corresponding to the user's request is document data 920 including a character, a symbol or an image, the data resulting from the operation is transmitted to a document data processor and displayed in the form of an image or a character in step 940 or 950. If the data is multimedia data 930 including a moving image, the data resulting from the operation is transmitted to a multimedia data processor and displayed in the form of a moving image in step 960. Here, document data and multimedia data are simultaneously displayed using document data recording the features of the multimedia data or the order therein.

The present invention can be applied to a variety of fields. For example, in the case where a user wants to find a situation related to application for a driver's license, if the user enters the name of a related situation, the flow of situations of the application for a driver's license preceding and succeeding the entered situation is displayed, and the names of objects are listed as the names of related situations in order of time and space. When a situation in a particular region (space) is intended to be found, a system is designed to ask a user a particular time. If the user does not answer, the system shows situations taken place in the particular region at the time corresponding to a default value in order of time. In addition, a situation is found using a module name or an object name, the flow of the situation contained in the situation is found, and the flow of an action contained in a particular module is found. For example, by clicking a situation related to traffic accidents, sentences and words about every module and action related to the traffic accidents can be derived. When a user wants to know a relationship between two objects, situations simultaneously appearing with the two objects and the roles played by the two objects in these situations are displayed. Particularly, in the case of a database including a moving image such as a film or a video, each event in the moving image is defined as a situation, each cut of motion occurring in the situation is defined as an action, and a set of actions is defined as a module so that a user can extract and view necessary part only in the moving image. Besides, the present invention can be applied to a variety of fields of industry such as English education, Internet search, newspaper search and case search.

An information modeling method and a database search system according to the present invention have the following advantages.

First, when a user requests information such as historical materials, industrial information, documents, educational information or video information, the information is analyzed into temporal element, spatial element, temporal and spatial element, keyword, situation name, action and so on which are the elements of the user's request. Then, a database established according to information modeling according to the present invention is searched for situations, modules and actions related to the user's request so that information desired by the user can be extracted. Accordingly, probability of searching for desired information only increases.

Second, since a database system can process a user's request for information and can be extended simply by adding data, update and modification of the system is not necessary. Accordingly, cost for the update and modification of the system can be saved, and the inconvenience of using the system can be reduced.

Besides the above direct effects, information modeling and a search method using the information modeling according to the present invention have the following technological effects and expected effects.

First, multimedia contents in various fields such as linguistic, cultural, video and historical educations can be produced. Accordingly, methods of designing multimedia contents will be concretized and varied so that multimedia technology will be actively developed to support them. As a result, employment of personnel will increases in relation to production of linguistic, cultural and historical scenarios and videos. Moreover, the present invention will accelerate the development of multimedia technology and the growth of ultrahigh-speed network business.

Second, by using contents produced according to the present invention in the field of education, effects such as interactive multimedia education between users and providers, preparation of a learning environment suitable for a user's characteristics, and encouraging a user to learn can be expected. These contents produced according to the present invention can be utilized more intensively to cultivate excellent personnel suitable for the globalized and information-oriented age.

Third, the present invention prepares a foundation capable of providing multimedia educational contents suitable for commercialization of International Mobile Telecommunications (IMT)-2000 so that effects such as expansion of network facilities necessary for transmitting a large amount of data, development of hardware industry, changes in competitive relations between basic network providers, and real-time situation study for wireless terminal users can be obtained.

What is claimed is:

1. A method for enabling a user to search for a selected portion of a moving image from a database, the method comprising
   selecting a multimedia file including a moving image;
   analyzing the multimedia file so that the multimedia file is divided into a plurality of actions, the action being a minimum semantic unit that is meaningful for the user and each action being associated with at least one keyword;
   establishing a hierarchical database comprising a plurality of actions and at least one module, each module including at least two actions;
   accepting an input from the user including a search keyword and designating granularity to search for at least one of action and module; and
   generating a search result using the search keyword at an action level or at a module level based on the designated granularity, whereby a data size of the search result is controlled by the user.

2. A multimedia database system comprising:
   a data storage for storing multimedia data organized in a hierarchical structure of a plurality of actions and at least one module, the action being a minimum semantic unit of the multimedia data that is meaningful for the user and each action being associated with at least one keyword, each module including at least two actions;
   an input device for accepting a user input, the user input including a search keyword and designating a granularity to search for one of action and module; and
   a processor for performing a search to generate an output including based on the search keyword and the designated granularity, the output being generated at an action level or at a module level in accordance with the designated granularity, whereby a data size of the output is controlled by the user.

3. The method of claim 1 wherein the hierarchical database further comprises at least one situation that includes at least two modules, the designated granularity indicates at least one of action, module and situation, and the search result is generated at an action level, at a module level or at a situation level based on the designated granularity.

4. The multimedia database system of claim 2 wherein the hierarchical structure further includes at least one situation that includes at least two modules, the designated granularity indicates at least one of action, module and situation, and the processor performs the search at an action level, at a module level or a situation level in accordance with the designated granularity.

* * * * *